No. 824,008. PATENTED JUNE 19, 1906.
G. E. GOWDY.
DOUGH CUTTING MACHINE.
APPLICATION FILED FEB. 21, 1905.

3 SHEETS—SHEET 1.

WITNESSES,
INVENTOR,
BY
ATT'Y.

No. 824,008. PATENTED JUNE 19, 1906.
G. E. GOWDY.
DOUGH CUTTING MACHINE.
APPLICATION FILED FEB. 21, 1905.

3 SHEETS—SHEET 2.

WITNESSES.
INVENTOR,
George E. Gowdy
BY
ATT'Y.

No. 824,008. PATENTED JUNE 19, 1906.
G. E. GOWDY.
DOUGH CUTTING MACHINE.
APPLICATION FILED FEB. 21, 1905.
3 SHEETS—SHEET 3.
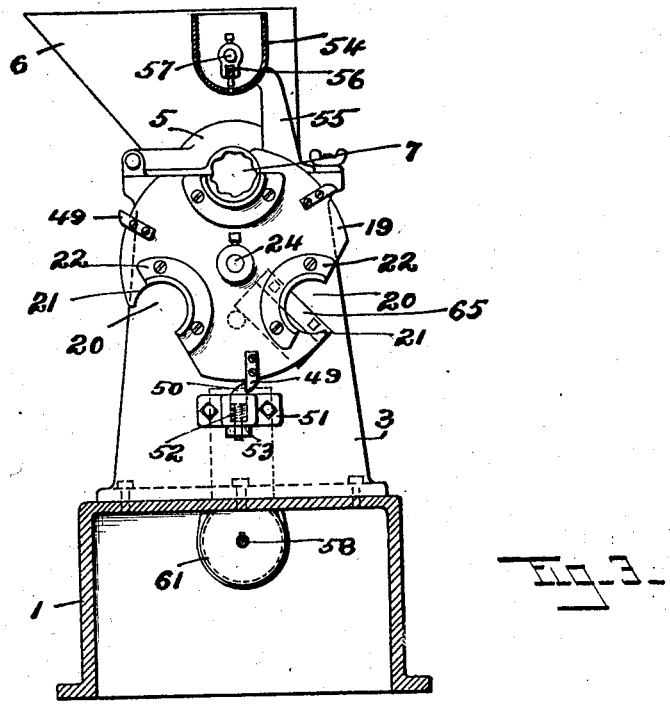
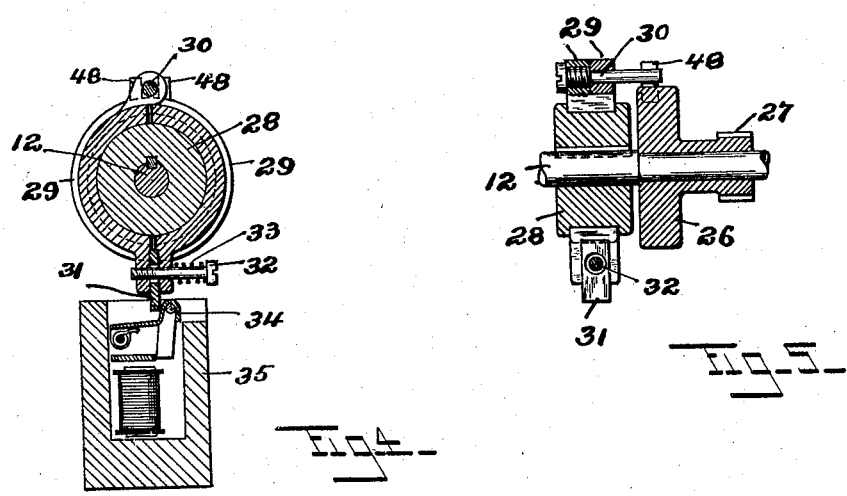
WITNESSES,
Florence H. Hook
J. P. Dejon
INVENTOR,
George E. Gowdy
BY George E. Hall ATTY.

UNITED STATES PATENT OFFICE.

GEORGE E. GOWDY, OF NEW HAVEN, CONNECTICUT.

DOUGH-CUTTING MACHINE.

No. 824,008.  Specification of Letters Patent.  Patented June 19, 1906.

Application filed February 21, 1905. Serial No. 246,691.

*To all whom it may concern:*

Be it known that I, GEORGE E. GOWDY, a citizen of the United States, residing at New Haven, in the county of New Haven and State of Connecticut, have invented certain new and useful Improvements in Dough-Cutting Machines, of which the following is a specification, reference being had therein to the accompanying drawings.

My invention relates to new and useful improvements in dough-cutting machines, and has for its object, among other things, the construction of a machine in which dough may be cut into predetermined sizes by mechanism set in motion by the action of the dough itself and to accomplish this result with a device that will be simple in its operation, of few parts, so designed as to be economically constructed and assembled, and which can be controlled and operated by an unskilled workman.

To these and other ends my invention consists in the dough-cutting machine having certain details of construction and combination of parts, as will be hereinafter described, and more particularly pointed out in the claims.

Figure 1:
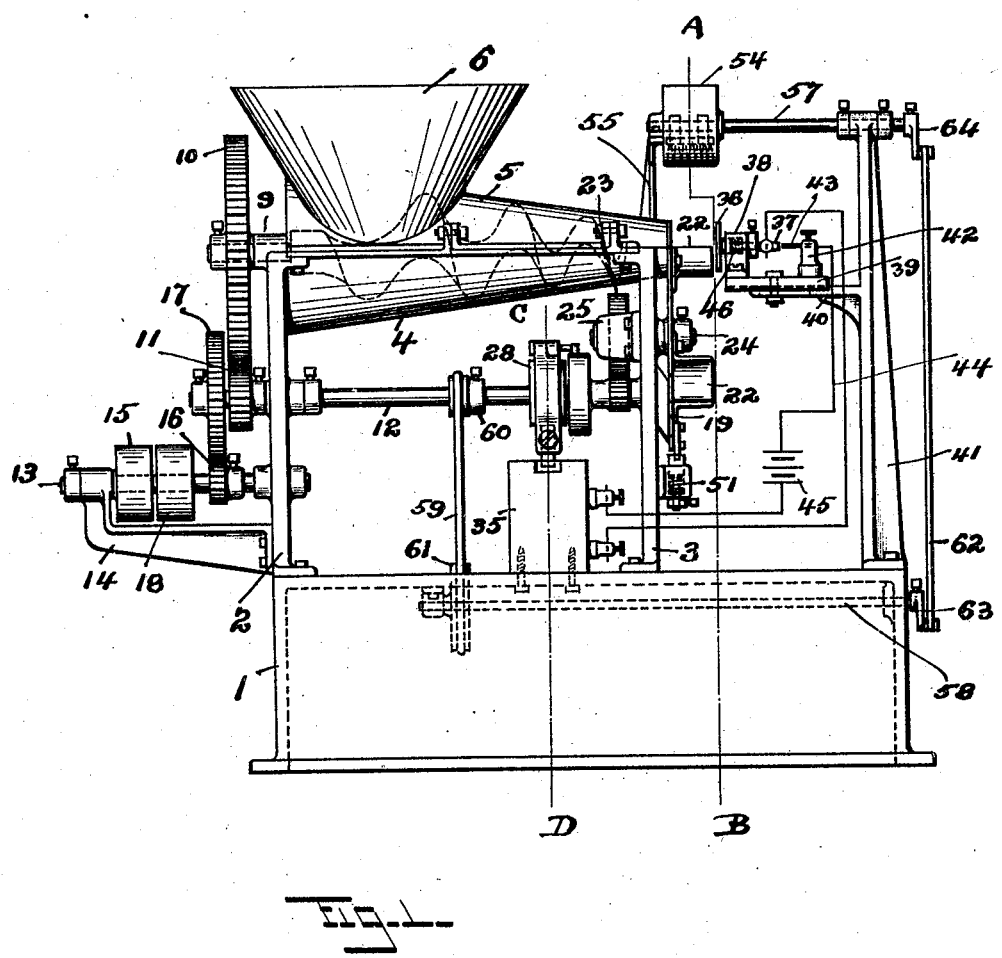
Figure 2:
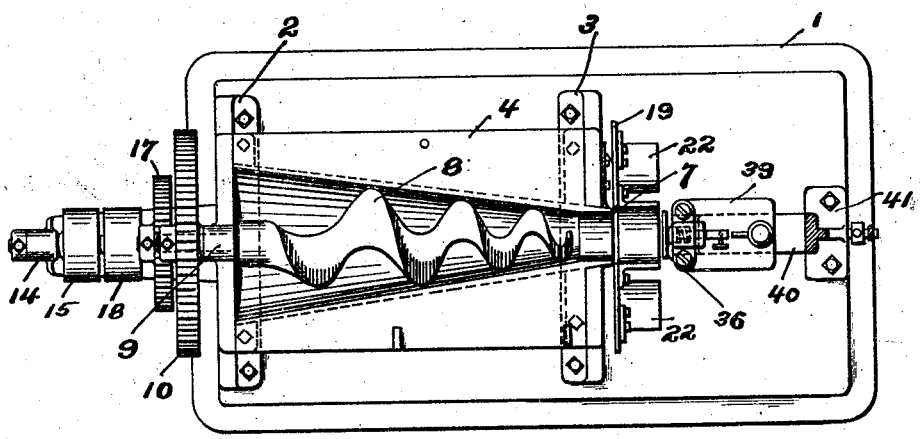

Referring to the drawings, in which like numerals of reference designate like parts in the several figures, Figure 1 is an elevation of my improved machine complete. Fig. 2 is a partial plan view thereof with the upper case removed. Fig. 3 is a transverse sectional view thereof, taken upon line A B of Fig. 1. Fig. 4 is a sectional view of the clutch and friction mechanisms, taken upon line C D of Fig. 1; and Fig. 5 is a longitudinal sectional view of the friction mechanism.

In the prior art the dough-cutting machines have used a plurality of knives having a continuous rotary movement about a vertical axis which severally cut off the projecting dough as they pass the same irrespective of its size, thereby producing dough balls of sizes that vary greatly, and hence rendering the device of little practical value. In my invention mechanism is provided whereby the dough itself will operate the cut-off knife when a predetermined quantity of dough has passed the same. The speed with which the dough is moved in my machine is immaterial, as the cut-off mechanism will not be operated until the predetermined quantity of dough has been fed therethrough.

In carrying out my invention I provide a base 1, and secured to the top thereof are the standards 2 and 3, which support the shell or casing 4, to which is hinged the upper casing 5 having a hopper-opening 6 projecting upwardly therefrom. The open space between the upper casing 5 and lower casing 4 when closed is conical in shape, the larger end being adjacent to the hopper 6 and the smaller or contracted end forming a discharge-opening 7 at the opposite end. Within this conical chamber is rotatably mounted the conveyer or worm 8, which is journaled at one end in the bearing 9 and having fixed to its outer end the gear 10, which is driven by the pinion 11, fixed on the rotary shaft 12, journaled at either end in the standards 2 and 3. The shaft 13 is journaled in the standard 2 and bracket 14 fixed thereto and is driven by a belt engaging the fixed pulley 15. Fixed to the shaft 13 is a pinion 16, which meshes into and drives a gear 17, fixed to the shaft 12. Rotatable upon the shaft 13 is the loose pulley 18, onto which the driving-belt is shifted when it is desired to stop the mechanism. The cutter-head is designated 19 and having preferably three cutter-openings 20 therethrough, the inner edges 21 of which are sharpened so as to form knife-edges or cutters. Fixed to the face of said cutter-head concentric with the openings 20 and at a right angle to said plate are the carrier-cups 22. This cutter-head is rotated by mechanism which comprises a shaft 24, upon which said cutter-head is fixed, rotatable in the standard 3 and bracket 25 affixed thereto, a gear 23 on said shaft, a collar 26 loosely mounted upon the shaft 12 and having integral therewith a pinion 27, which meshes into the gear 23, a friction-clutch comprising a head 28, fixed to the shaft 12 and the semicircular friction-straps 29, which are hinged together by the bolt 30, one end of which bolt projects laterally, as shown in Fig. 5, a lever-plate 31 and a spring-bolt 32, which passes through a radial lip upon one of said straps through the lever-plate 31 and threaded into a radial lip upon the other of said straps and surrounded by the coil-spring 33. The said friction-clutch is actuated by means of an electric clutch, which is herein designated 34 and is mounted within a block 35, fixed to the base 1. The construction of this electric clutch forms no part of my invention, and therefore I have not shown it in detail and do not purpose to describe it, as any type of electric clutch can be used with my device.

The mechanism through which the electric clutch is operated forms a part of my invention and, as herein illustrated, comprises a plate 36, mounted upon a rod 37, that is endwise movable within a standard 38, fixed to a plate 39, shiftable upon the bracket 40, integral with the upright 41, that is secured to the base 1. When the cutter-head is at rest, the axes of the conveyer, the opening 20 in the cutter-head, the carrier-cups 22, and the plate 36 are coincident. Fixed to the plate 39 is a binding-post 42, within which is fixed a contact-bar 43. The rod 37 and contact-bar 43 are connected with the electric clutch and a battery 45 by suitable electric wiring 44. It is of course understood that wherever necessary the parts are insulated, as is common in the art. When the cutter-head is stationary, the lever-plate 31 engages a part upon the electric clutch and by its leverage upon the radial lips holds the straps 29 apart, so as to release their friction upon the head 28, which rotates freely without actuating the clutch mechanism.

In operating my improved dough-cutting machine the dough is placed in the hopper 6, from which it passes into the conical chamber between the casings 4 and 5, and is conducted by the conveyer or worm to the discharge-opening and out of the same into the cups 22, that are in register therewith, until the end thereof engages the plate 36, which is pushed by said dough against the action of the spring 46 until the end of the rod 37 engages the contact-bar 43, which completes the electric circuit, and the electric clutch is actuated, thereby releasing the lever-plate 31, and the straps 29, which are then forced and held together by the spring 33, grip the head 28, which imparts a rotary movement to said clutch. This rotary movement is conveyed to the collar 26 by the screw-rod 30, which projects between the two radial pins 48, fixed in said collar and to the cutter-head through the pinion 27 and gear 23. During this movement the cutter 21 cuts off the dough, which drops into the cup 22 and from thence into a receptacle conveniently arranged to receive it or upon a conveyer-belt, as desired, at the next rotation of the cutter-head. As soon as the dough is cut off and carried out of line with the plate 36 the spring 46 forces the plate forward to its original position, breaking the electric circuit, and the electric clutch again engages the lever 31, which releases the clutch mechanism, bringing the cutter-head to a full stop until sufficient dough has been forced into the next succeeding cup and the plate 36 operated as before. The scraper 65 is fixed to the standard 3 and bears against the inner face of the cutter-head to remove any surplus dough that may adhere thereto.

To insure the positive registering of the openings 20 with the discharge-opening 7, I have provided a stop mechanism which comprises stop-arms 49, secured to the cutter-head 19, a bevel-headed stop-rod 50, movable vertically within a block 51, fixed to the standard 2, a spring 52, and collar 53, fixed to said stop and engaging the under side of said block. The plates 49 as they rotate in one direction will engage the bevel-head of said stop-rod and depress the same; but immediately upon passing said stop-rod the spring 52 will throw the same upwardly and prevent the cutter-head from being operated in the reverse direction.

Above the carrier-cup when at rest and in line with the discharge-opening is the trough 54, supported by the bracket 55, and within this trough is a scraper 56, fixed to a rock-shaft 57, that is journaled at one end in the upright 41 and at the other end in the bracket 55. Motion is imparted to this rock-shaft through the shaft 58, which is rotatably mounted in the base 1 and driven by a belt 59, passing over the pulley 60 of the shaft 12 and the pulley 61 upon the shaft 58, and joining the shafts 57 and 58 is the connection rod 62, which is movably secured at one end to a crank-arm 63, fixed on the shaft 58, and at the other end to a crank-arm 64, fixed on the shaft 57. Flour is placed within the trough 54, and the scraper agitates it so that a portion of the same drops through the perforations in the bottom thereof onto the dough in the carrier-cup and flours the dough before the same leaves the dough-cutting machine. The cups 22 may be made cylindrical and the dough pushed therefrom, if desired.

The machine has been described as being used for cutting dough, but it will operate equally as well with any other plastic material.

There are many minor changes and alterations that can be made within my invention aside from those herein suggested, and I would therefore have it understood that I do not limit myself to the exact construction herein shown and described, but claim all that falls fairly within the spirit and scope of my invention.

Having described my invention, what I claim as new, and desire to secure by Letters Patent, is—

1. In a dough-cutting machine, the combination with a casing having a chamber therein terminating at its outer end in a discharge-opening; of a cutter-head mounted adjacent to said discharge-opening, and having an opening therethrough designed to be brought into register with said discharge-opening; and a cup secured to said cutter-head and forming an extension of the aforesaid chamber when the opening in said cutter-head is in register with said discharge-opening.

2. In a dough-cutting machine, the combination with a casing having a chamber therein terminating at one end in a discharge-opening; of a conveyer operative therein; a cutter-head rotatably mounted adjacent to said discharge-opening with its axis substantially parallel therewith and having a plurality of openings therethrough; of cups secured to said cutter-head concentric with said openings; and means for imparting an intermittent rotary movement to said cutter-head.

3. In a dough-cutting machine, the combination with a casing having a chamber therein terminating at one end in a discharge-opening; a cutter mounted so as to pass said discharge-opening during its movement; clutch mechanism for imparting movement to said cutter; electric means for actuating said clutch mechanism, said electric means having a fixed contact-point and a movable contact-point, said movable contact-point being actuated by the dough projecting from said discharge-opening.

4. In a dough-cutting machine, the combination with a casing having a chamber therein terminating at one end in a discharge-opening; of a cutter-head rotatable adjacent to said discharge-opening; electrically-actuated means for imparting an intermittent rotary movement to said cutter-head having a fixed contact-point and a movable contact-point, said movable contact-point being actuated by the dough passing through said discharge-opening.

5. In a dough-cutting machine, the combination with a casing having a chamber therein terminating at one end in a discharge-opening; of a cutter-head rotatable adjacent to said discharge-opening and driven from a continuously-rotating shaft by friction mechanism; means for actuating said friction mechanism, comprising an electric clutch, a fixed contact-point and a movable contact-point, said movable contact-point being actuated by the dough passing through said discharge-opening.

In testimony whereof I affix my signature in presence of two witnesses.

GEORGE E. GOWDY.

Witnesses:
GEORGE E. HAY,
FLORENCE H. MONK.